United States Patent
Speed

[15] 3,636,914
[45] Jan. 25, 1972

[54] DIAL INDICATOR STOP

[72] Inventor: Kenneth O. Speed, Petaluma, Calif.

[73] Assignee: Speed Gage & Tool Company, Petaluma, Calif.

[22] Filed: July 6, 1970

[21] Appl. No.: 52,185

[52] U.S. Cl. .................................116/115.5, 82/34 A
[51] Int. Cl. ...................................................B23q 17/00
[58] Field of Search ................116/115, 115.5, 124; 85/84; 287/52.08; 82/34.12, 34.2, 34.3, 34.4; 192/116.5

[56] References Cited

UNITED STATES PATENTS

| | | | |
|---|---|---|---|
| 1,231,946 | 7/1917 | Shellenback | 82/34.1 |
| 2,148,348 | 2/1939 | Groene et al. | 82/34.1 |
| 2,361,453 | 10/1944 | Casella | 82/21 |
| 2,712,260 | 7/1955 | Wright | 82/34.1 |
| 2,776,590 | 1/1957 | Korichek | 82/34.1 |
| 2,917,445 | 12/1959 | Oakes et al. | 116/124 X |
| 3,154,984 | 11/1964 | Waymouth | 82/34 |
| 3,316,646 | 5/1967 | Novey | 116/115.5 X |

Primary Examiner—Louis Capozi
Attorney—Edward D. O'Brian

[57] ABSTRACT

A dial indicator stop mechanism for use with machines such as lathes can be constructed utilizing two separate assemblies, either of which can be mounted upon a fixed part of such a machine and the other of which can be mounted on a movable part of such a machine. Preferably, the assembly utilized upon the fixed part of the machine such as the headstock of a lathe comprises a rod mounting member through which there projects a measuring rod. The rod mounting member and the rod are provided with coacting detent means enabling the rod to be positioned in various positions relative to the rod mounting member. Preferably an end of the rod mounting member carries a turret which can be rotated so that a selected member on it is in the line of travel of the second assembly of the complete indicator stop. This second assembly includes an indicator mount adapted to be attached to a movable part of the machine such as the carriage of the lathe and a known dial indicator mounted upon such a mount so that the actuating rod extending from the indicator will engage the member on the turret which is in the line of travel of the second assembly.

9 Claims, 12 Drawing Figures

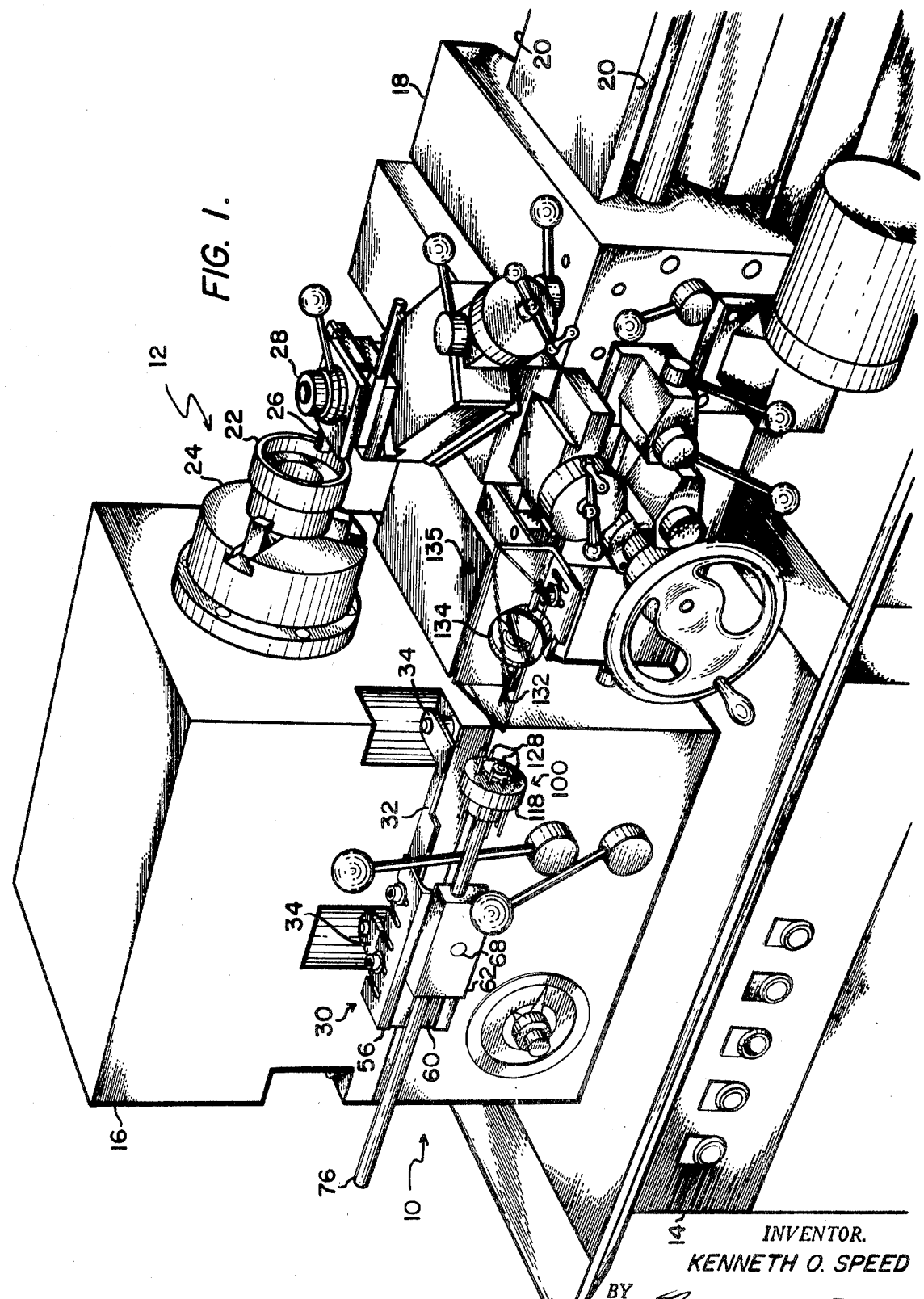

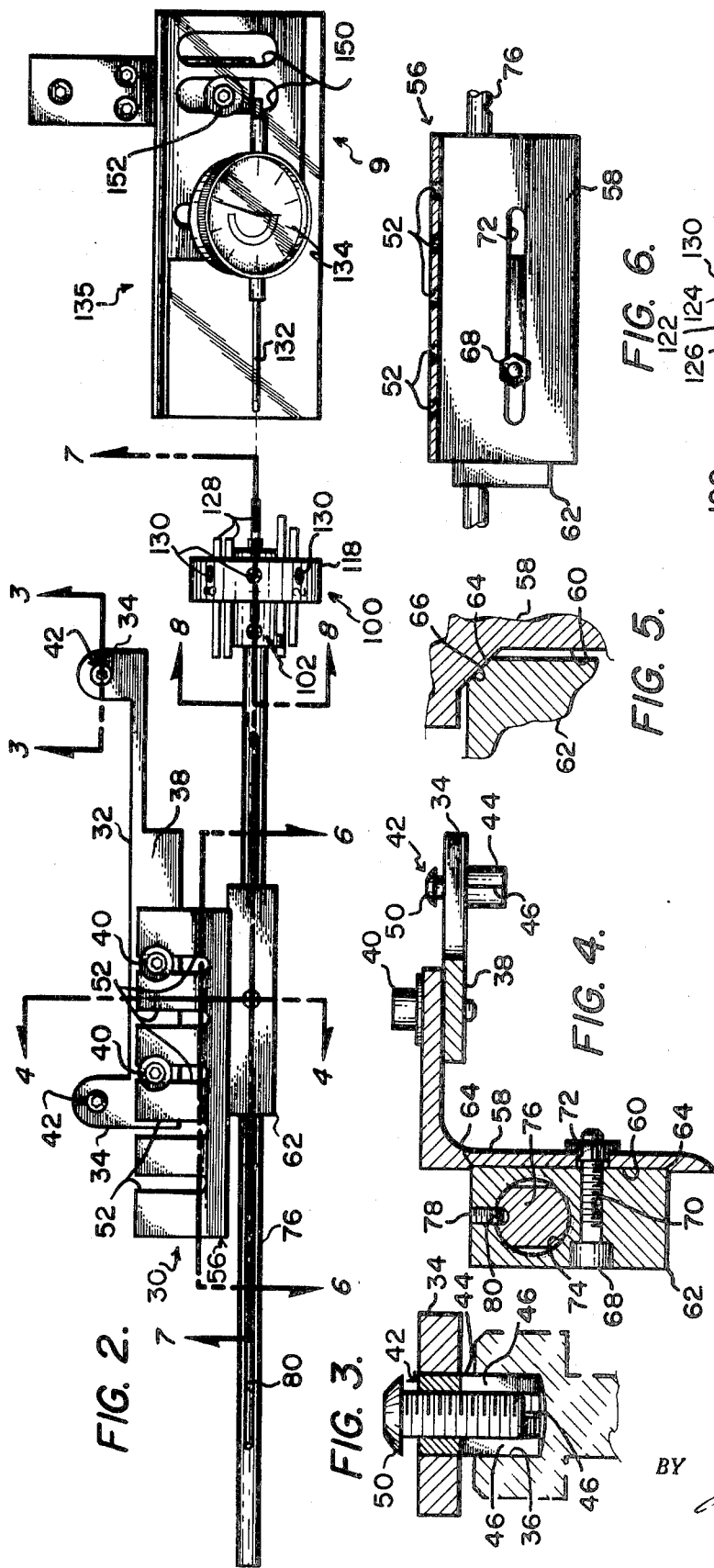

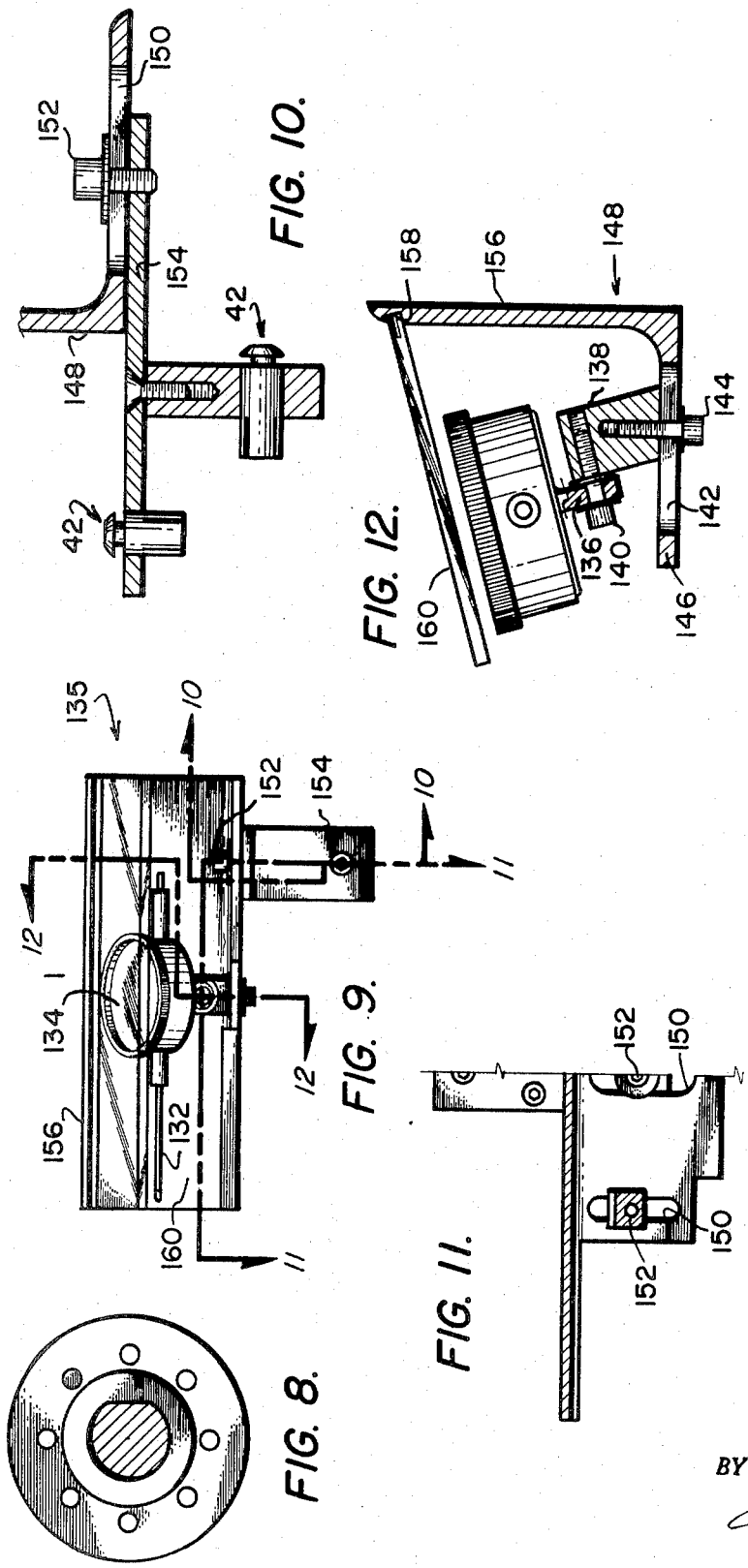

DIAL INDICATOR STOP

BACKGROUND OF THE INVENTION

So-called "stops" are utilized with machines such as lathes, various types of grinders and the like, so as to indicate the progress of forming or cutting operations. These instruments are employed so as to measure the amount that a traveling or moving portion of a machine such as a lathe travels or moves relative to a fixed portion of such a machine such as a head stock so as to indicate the progress of a particular operation being carried out on a workpiece located between such fixed and movable portions of a machine. Thus, such indicator stops are utilized between the traveling carriage and the head stop on a common lathe so as to indicate to a lathe operator the extent to which a cutting operation has been performed on a particular workpiece rotatably mounted on the lathe headstock.

In the past various indicator stops for use in controlling the operation of machines as indicated have been developed and utilized. An understanding of the present invention does not require a detailed analysis of such prior devices. Certain of such prior devices are considered to have been unnecessarily expensive to construct. Certain of such prior devices have tended not to have performed satisfactorily because of the fact that they are affected by surface imperfections and the normal accumulation of shipped fragments. In some of such prior devices spring action has tended to adversely effect accuracy and to cause what is considered to be excessive wear. Also certain of such prior devices have been relatively difficult to utilize

SUMMARY OF THE INVENTION

A broad objective of the present invention is to provide new and improved indicator stops which are to be used as indicated in the preceding discussion. Broadly an objective of the present invention is to provide dial stop indicators which overcome various disadvantages and limitations of prior related devices such as are set forth in a generalized manner in the preceding discussion.

More specifically objectives of the present invention are to provide indicator stops which may be easily and conveniently installed on a machine such as a lathe or a grinder; which may be installed so as to be utilized with virtually any type of feed or cutting or forming tool movement; which are capable of being easily and conveniently installed and used; which are capable of long wear; which provide accurate indications of relative positions; which are relatively immune from breakage if not used properly; which may be easily and conveniently adjusted so as to provide different position indications as desired.

In accordance with this invention these objectives are achieved through the utilization of two separate assemblies, either of which can be mounted on a fixed or nonmovable part of a machine and the other of which can be mounted upon a movable part of a machine. Thus, for example, one assembly can be mounted upon the headstock of a lathe and the other assembly mounted upon the tailstock of a lathe. Such assemblies, may however, be mounted on a piece of equipment such as a lathe so as to be used in indicating other types of relative motion such as cross-feeding motion or the like. Such assemblies can also be used on other machines than lathes such as upon certain types of grinders.

Preferably, the assembly utilized so as to remain stationary includes a rod mounted so as to extend through a rod mounting member. The rod mounting member should be constructed so as to include detent means coacting with other detent means on the measuring rod so that the measuring rod may be positioned in various predetermined positions relative to the rod mounting member with a minimum of difficulty. In the preferred construction of this invention the rod mounting member carries a turret which can be rotated so that a selected member on it is in the line of travel of the second assembly of the complete indicator stop. This second assembly includes an indicator mount adapted to be attached to a movable part of a machine and a dial indicator mounted on the mount so that the actuating rod for the indicator will engage the member on the turret which is in the line of travel of the second assembly when the machine part upon which it is located moves toward the machine part upon which the first assembly is located.

BRIEF DESCRIPTION OF THE DRAWINGS

The actual details of the present invention and various advantages of it will be apparent from a detailed consideration of the remainder of this specification and the accompanying drawings in which:

FIG. 1 is an perspective view showing a presently preferred embodiment of a dial indicator stop of this invention installed upon a conventional lathe;

FIG. 2 is a top plan view of this dial indicator stop as it appears upon such a lathe, but removed from the lathe;

FIG. 3 is a partial cross-sectional view showing a mounting bolt structure as used with the dial indicator stop engaged with a part of the lathe, this view corresponding to a cross-sectional view taken at line 3—3 of FIG. 2;

FIG. 4 is a cross-sectional view taken at line 4—4 of FIG. 2;

FIG. 5 is an enlarged partial cross-sectional view of a part of the structure shown in FIG. 4, this view corresponding to a part of the view taken at line 4—4 of FIG. 2;

FIG. 6 is a partial cross-sectional view taken at line 6—6 of FIG. 2;

FIG. 7 is a partial cross-sectional view taken at line 7—7 of FIG. 2 of an assembly of the complete structure shown in FIG. 2 in which certain parts are shown in elevation for convenience of explanation and illustration;

FIG. 8 is a partial cross-sectional view taken at line 8—8 of FIG. 2;

FIG. 9 is a front plan view of an assembly of the complete structure shown in FIG. 2 taken in the direction of the arrow 9 in FIG. 2;

FIG. 10 is a partial cross-sectional view taken at line 10—10 of FIG. 2;

FIG. 11 is a partial cross-sectional view taken at line 11—11 of FIG. 9; and

FIG. 12 is a partial cross-sectional view in which a part is shown in elevation taken at line 12—12 of FIG. 9.

It will be realized from a careful consideration of the accompanying drawings that the precise structure shown is not the invention, but embodies the invention concepts of the invention. From this it will be similarly apparent that other somewhat differently appearing and somewhat differently constructed dial indicator stops may utilize the essential features of principles of this invention. For this reason, the accompanying drawings are not to be taken as limiting or defining the invention itself.

DETAILED DESCRIPTION OF THE PREFERRED EMBODIMENT

In the drawings there is shown an indicator stop 10 of the present invention installed upon a complete lathe 12. This lathe 12 forms no part of the invention, and is merely shown in enough detail in the drawings to indicate the preferred environment of use of the indicator stop 10. This lathe includes a base 14, a conventional headstock 16 and a conventional carriage 18 which is adapted to be moved on ways 20 toward and away from the headstock 16. The purpose of such motion is to accomplish a cutting operation upon a workpiece 22 held upon a rotatable chuck 24 mounted upon the headstock 16. Such cutting is accomplished by means of a cutting tool or bit 26 located upon a tool holder 28 on the carriage 18. This carriage 18 includes various means unimportant to a description of this invention which are designed so as to position the cutting tool 26 in a desired location relative to the carriage 18.

The indicator stop 10 includes a first assembly 30 which, in the embodiment of the invention shown, is mounted upon the headstock 16. Such mounting may be accomplished through the use of mounting brackets 32 having perforated ears 34 adapted to be located over existing socket headcap screws 35 having top openings 36 on the headstock 16. This mounting bracket 32 includes a mounting plate 38 carrying screws 40 for use as hereinafter described. The ears 34 are adapted to be screwed in place through the use of fastening structures 42.

The particular structures 42 used to secure the ears 38 to the openings 36 are considered important with the present invention. One of these structures 42 is shown in FIG. 3 of the drawing. It consists of a cylindrical sleeve 44 formed out of a deformable metal such as brass, copper or the like. The sleeve 44 is provided with a plurality of equally spaced slots 46 leading from one of its ends towards the other of its ends parallel to its axis. The interior of this sleeve is provided with full threads going partially along its length so as to be spaced from the end of the sleeve 44 in which the slots 46 commence, and partial threads along this end of the sleeve.

With this construction the sleeve 44 can be inserted in an opening 36 so as to extend through one of the ears 34. Then a conventional bolt or screw 50 can be threaded into the sleeve 44. As such as fastener is tightened down the threads on the end of it will tend to engage the partially threaded interior portion of the sleeve 44 so as to expand this sleeve 44 in such a manner that it firmly engages the interior of the opening 36 within which it is located. This provides a very firm, substantially vibration proof connection between an ear 34 and the headstock 16, while can normally be used without modifying a lathe. Such a connection may be dissassembled should this be necessary or desirable.

The screws 40 are spaced so as to be capable of fitting within spaced, parallel slots 52 in the top plate 54 of a generally L-shaped holder 56. With this construction, the holder 56 can be secured in place in a desired position by merely tightening down the screws 40. This holder 56 includes a sideplate 58 extending along its length. This sideplate 58 carries a generally rectilinear outwardly facing recess 60 adapted to act as a guide or a way for a rod-mounting member 62. This rod-mounting member 62 has generally the shape of a rectilinear geometric structure. It includes tapered top and bottom edges 64 which rest against corresponding slanted corners 66 in the recess 60.

This structure of these edges 64 and the corners 66 is considered to make it possible to accurately position the members 62 at any desired position along the length of the recess 60. Such positioning is accomplished through the use of a single bolt 68 extending through a hole 70 in the member 62 and through a slot 72 located in the sideplate 58. This slot 72 extends along the length of the sideplate 58, so as to permit the member 62 to be mounted in various positions.

When the member 62 is mounted upon the holder 56 as described, an end to end bore 74 in it is located so as to extend parallel to the recess 60. A measuring rod 76 extends through the bore 74 in such a manner that it can be shifted relative to the member 62 manually with a minimum of difficulty. A small set screw 78 engages a small groove 80 in the rod 76 to prevent rotation of the rod 76 and to limit linear movement of the rod 76.

The bottom of the rod 76 opposite the groove 80 is preferably provided with a series of equally spaced depressions or notches 82 designed to be engaged by a ball 84 in a hole 86 in the member 62. This ball 84 is normally biased towards the rod 76 so as to fit within whatever notch 80 is opposite it by a small coil spring 88 held in place by a cone screw 90 threaded into the hole 86. If desired an additional retainer 92 may be located in a cross-hole 94 so as to engage a side of the ball 84 in such a manner as to tend to lock it accurately in position against a surface of the hole 86. This retainer 92 is biased towards the ball 84 by another spring 96 which in turn is held in place by another threaded cone screw 98 which engages the cross-hole 94. This retainer 92 serves to bias the ball 84 towards the side of the hole 86 so that it always rests in the same position. Thus it serves as a means for holding the ball 84 in the same position.

This structure including the ball 84 and the notches 82 may be referred to as a detent means enabling the rod 76 to be held reasonably firmly in any of a plurality of predetermined positions relative to the mounting member. Such positions may be indicated by numbers on the rod 76 as shown in FIG. 7. This feature enables the rod 76 to be accurately positioned in any of a number of positions so as to extend from the member 62 a desired distance within a minimum of difficulty.

The end of the rod 76 remote from the member 62 carries a small rotatable turret 100. This turret 100 includes a generally cylindrical mount 102 having an axially located bore 104 which is adapted to fit around the exterior of the rod 76. This mount 102 is preferably secured in place against the end of the rod 76 through the use of a small set screw 106 in accordance with conventional practice. A reduced extension 108 of the bore 104 carries a bolt 110 in such a manner as to clamp a holding plate 110 opposite an end of the mount 102.

This holding plate 112 includes a plurality of equally spaced depressions 114, each of which is adapted to be engaged by a detent ball 116 carried by a rotatable holder 118. This holder 118 is mounted between a plate 112 and a shoulder 120 on the mount 102 so as to be capable of rotation relative to the mount 102. The detent balls 116 are located in bores 122 in the holder 118 against coil springs 124 so that they are normally biased outwardly into contact with the depressions 114 in the holding plate 112. The depressions 114 and the balls 116 constitute other detent means designed to be used in indexing the turret 100.

The holder 118 is provided with a mounting hole 126 corresponding to each of the detent balls 116. These holes 126 are parallel to the axis of the mount 102 and of the rod 76 and are equally spaced from this axis. These holes 126 carry individual stop members 128 in such a manner as to extend generally from the turret 100. Such stop members 128 are secured against movement by conventional set screws 130. The positions of these stop members 128 may be conveniently adjusted through the use of the set screws 130 so that they extend from the turret 100 various distances as may be required for given or anticipated cutting or related operations.

The turret 100 is designed so that a single one of the stop members 128 will be directly opposite and in the line of travel of an actuating rod 132 extending from a known conventional dial indicator 134 forming a part of a second assembly 135 as shown in FIG. 9. This indicator 134 includes a mounting tab 136 which is secured to a support 138 by means of a common bolt 140. This support 138 is secured in a cross slot 142 by means means of another bolt 144. The slot 142 is formed in the bottom 146 of a generally L-shaped mounting bracket 148. This bracket 148 is provided with two parallel mounting slots 150 for use with one or more bolts 152 in attaching the bracket 148 to the carriage 18. Depending upon the construction of the carriage 18, an intermediate mounting bracket 154 as shown in FIGS. 9 and 10 of the drawing may be required. It is preferred to utilize fastening structures such as the structure 42 in engagement with the carriage 18 so as to establish a firm useable connection which will not be affected by vibration.

The bracket 148 may also include an upwardly extending side 156. This side 156 may be provided with a groove 158 having a rectangular bottom. The purpose of this groove 158 is to frictionally carry a transparent protective cover plate 160 so that this plate extends generally over the dial indicator 134 so as to prevent damage to it.

The utilization of the described structure is essentially simple. When the structure described is to be employed it may be mounted as shown. Further, the rod 76 and the turret 100 are positioned so that a particular stop member 128 is located in a position corresponding to a desired operation to be carried out with the cutting tool 26. Then the carriage 18 is operated in a conventional manner so that the cutting tool 26 is utilized. As the cutting tool 26 moves toward the workpiece 22 the actuating rod 132 will engage the stop member 128 in its line of travel. During continued movement of the carriage 18 the operator may read on the dial indicator 134 the progress of the operation being performed so as to either stop or reverse the carriage 18 after this operation has been carried out to a desired extent. The operator may do these things without the necessity of referring directly to the workpiece 22. This facilitates the operation of the lathe 12.

After one operation has been performed in this manner, the rod 76 may be shifted to a new desired position for another operation by merely pushing the rod 76 so that the ball 84 engages a notch 82 corresponding to such a new position. Similarly, with or without movement of the rod 76, the turret 100 may be rotated so that a different stop member 128 may be located in the line of travel of the actuating rod 132.

It is considered quite important that the operating rod 76 be used with what has been referred to in the preceding as detent means in order to prevent damage if for any reason an operator should fail to stop the carriage 18 at a proper time. With the construction shown if there should be such carriage overrun, the actuating rod 132 from the dial indicator 138 will "bottom out" in the indicator 138 so as to apply direct pressure to the stop member 128 engaged by it. Such pressure will cause movement of the rod 76 from the initially set location. This will accommodate such undesired carriage 18 movement without causing breakage.

From a careful consideration of the preceding, it will be realized that the structure shown and that the invention are quite advantageous and that the invention pertains to indicator stops which meet the various objectives as indicated in a preceding portion of the specification.

I claim:
1. An indicator stop which comprises:
    first and second assemblies, one of said assemblies being adapted to be mounted on a fixed part of the machine and the other of said assembly being adapted to be mounted on a movable part of the same machine, the movable part of this machine being movable in a linear path towards and away from said fixed part;
    said first assembly including a rod mounting member, a positioning rod mounted on said rod mounting member so as to be capable of being moved linearly with respect to said rod mounting member and means for preventing relative motion between said positioning rod and said rod mounting member except when pressure is applied to said positioning rod sufficient to overcome the force exerted on said positioning rod by said means preventing relative motion;
    said assembly including an indicator mount and an indicator having an actuating rod, said indicator being mounted on said indicator mount, said actuating rod being movable with respect to said indicator;
    said actuating rod being capable of engaging said positioning rod when said assemblies are mounted on fixed and movable parts of a machine and the movable parts of the machine is moved towards the fixed part of the machine, such engagement causing actuation of said indicator to indicate travel of the movable part relative to the fixed part;
    said positioning rod being capable of being moved relative to said rod mounting member in response to pressure applied by said actuating rod upon the maximum movement of said actuating rod relative to said indicator.
2. An indicator stop as claimed in claim 1 wherein:
    said means preventing relative motion between said positioning rod and said rod mounting member are detent means.
3. An indicator stop as claimed in claim 2 wherein:
    said detent means permits said positioning rod to be positioned in a plurality of predefined positions relative to said rod mounting member.
4. An indicator stop as claimed in claim 3 wherein:
    said detent means comprises a plurality of notches formed on said positioning rod, a ball located within said rod mounting member and spring means biasing said ball into any notch on said positioning rod opposite said ball.
5. An indicator stop as claimed in claim 4 including:
    means for holding said ball so that it always rests in the same position when said ball is engaged with one of said notches.
6. An indicator stop as claimed in claim 1 including:
    turret means located on the end of said positioning rod adjacent said actuating rod when said assemblies are mounted on a machine, said turret means including a plurality of stop members, said turret means being capable of being adjusted relative to said positioning rod so as to place any one of said stop members in a position to engage said actuating rod.
7. An indicator stop as claimed in claim 6 wherein:
    said turret means includes detent means for holding said stop members in predetermined positions.
8. An indicator stop as claimed in claim 1 including:
    turret means located on the end of said positioning rod adjacent said actuating rod when said assemblies are mounted on a machine, said turret means including a plurality of stop members, said turret means including a plurality of stop members, said turret means being capable of being adjusted relative to said positioning rod so as to place any one of said stop members in a position to engage said actuating rod;
    and wherein:
    said means preventing relative motion between said positioning rod and said rod mounting member are detent means;
    said detent means permits said positioning rod to be positioned in a plurality of predefined positions relative to said rod mounting member;
    said detent means comprises a plurality of notches formed on said positioning rod, a ball located within said rod mounting member and spring means biasing said ball into any notch on said positioning rod opposite said ball;
    said turret means includes detent means for holding said stop members in predetermined positions.
9. An indicator stop as claimed in claim 8 including:
    means for holding said ball so that it always rests in the same position when said ball is engaged with one of said notches.

* * * * *